US008311317B1

(12) United States Patent
Dow et al.

(10) Patent No.: US 8,311,317 B1
(45) Date of Patent: Nov. 13, 2012

(54) HIERARCHICAL SPATIAL REPRESENTATION FOR MULTIMODAL SENSORY DATA

(75) Inventors: Paul Alex Dow, Los Angeles, CA (US); Deepak Khosla, Camarillo, CA (US); David J Huber, Venice, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1125 days.

(21) Appl. No.: 12/192,918

(22) Filed: Aug. 15, 2008

(51) Int. Cl.
*G06K 9/00* (2006.01)
(52) U.S. Cl. .................................. 382/153; 382/293
(58) Field of Classification Search .................. 382/153, 382/154, 155, 276, 293; 348/147
See application file for complete search history.

(56) References Cited

U.S. PATENT DOCUMENTS

2002/0105484 A1* 8/2002 Navab et al. ................... 345/8

OTHER PUBLICATIONS

Cameron, S. A. 1996. Self-organizing neural networks for visual navigation and adaptive control. Boston University (dissertation, 132 pages).
Edsinger, A. 2007. Robot Manipulation in Human Environments. Massachusetts Institute of Technology. http://dspace.mit.edu/handle/1721.1/35727, (technical report, 228 pages).
Greve, D., S. Grossberg, F. Guenther, and D. Bullock. 1993. Neural representations for sensory-motor control, I: Head-centered 3-D target positions from opponent eye commands. Acta Psycho! (Amst) 82, No. 1-3: 115-38.
Grossberg, S., F. Guenther, D. Bullock, and D. Greve. 1993. Neural representations for sensory-motor control, II: learning a head-centered visuomotor representation of 3-D target position. Neural Networks 6, No. 1: 43-67.
Guenther, F., D. Bullock, D. Greve, and S. Grossberg. 1994. Neural Representations for Sensory-Motor Control, III: Learning a Body-Centered Representa tion of a Three-Dimensional Target Position. Journal of Cognitive Neuroscience 6, No. 4: 341-358.
Peters, R. A., K. A. Hambuchen, K. Kawamura, and D. M. Wilkes. 2001. The Sensory EgoSphere as a Short-Term Memory for Humanoids. Proc. of the IEEE-RAS Int'l Conf. on Humanoid Robots:22-24.
Shibata T., S. Vijayakumar, J. Conradt, and S. Schaal. 2001. Biomimetic oculomotor control. Adaptive Behavior 9, No. 3/4: 189-208.
Tweed, D. 1997. Three-Dimensional Model of the Human Eye-Head Saccadic System. Journal of Neurophysiology 77, No. 2: 654-666.
Vijayakumar, S., A. D'souza, T. Shibata, J. Conradt, and S. Schaal. 2002. Statistical Learning for Humanoid Robots. Autonomous Robots 12, No. 1: 55-69.

* cited by examiner

*Primary Examiner* — Andrew W Johns
(74) *Attorney, Agent, or Firm* — George R. Rapacki; Daniel R. Allemeier

(57) ABSTRACT

The present invention creates and stores target representations in several coordinate representations based on biologically inspired models of the human vision system. By using biologically inspired target representations a computer can be programmed for robot control without using kinematics to relate a target position in camera eyes to a target position in body or head coordinates. The robot sensors and appendages are open loop controlled to focus on the target. In addition, the invention herein teaches a scenario and method to learn the mappings between coordinate representations using existing machine learning techniques such as Locally Weighted Projection Regression.

6 Claims, 9 Drawing Sheets

Hierarchical Spatial Working Memory.

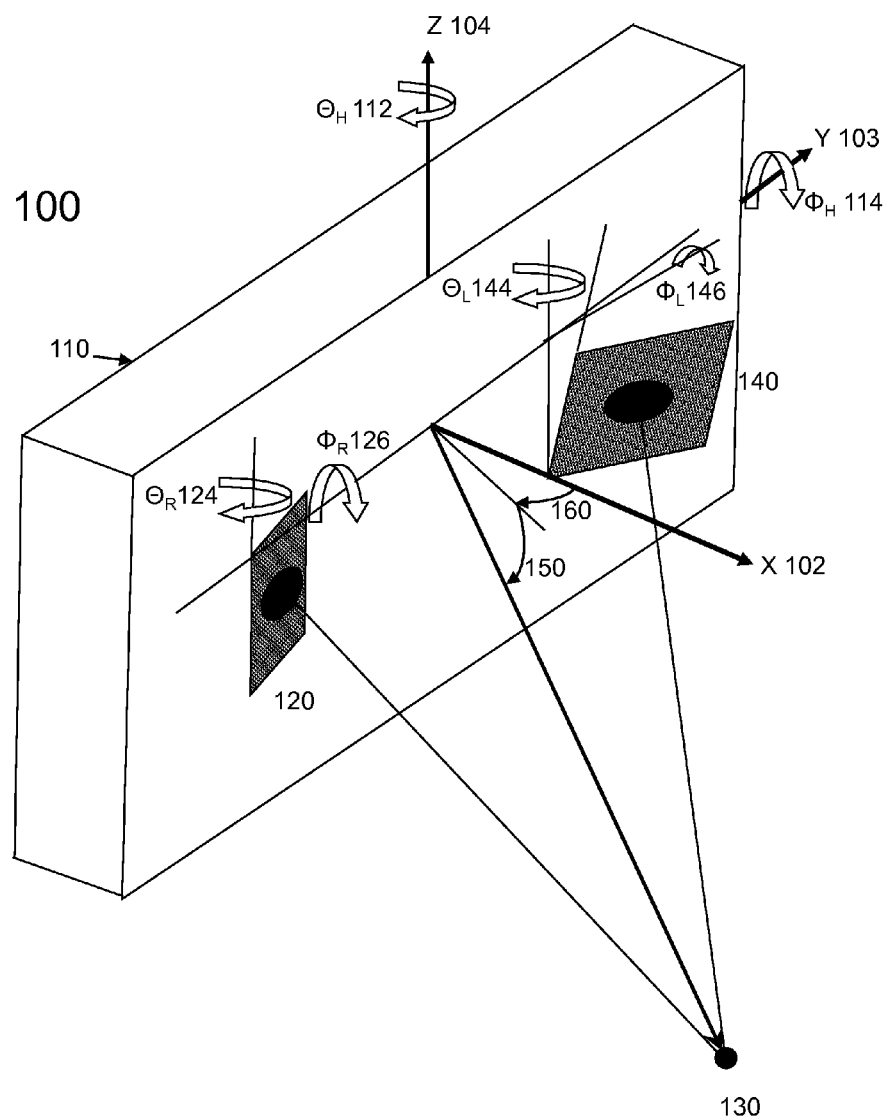
Figure 1a Robot Eyes, Head and Body Relationships

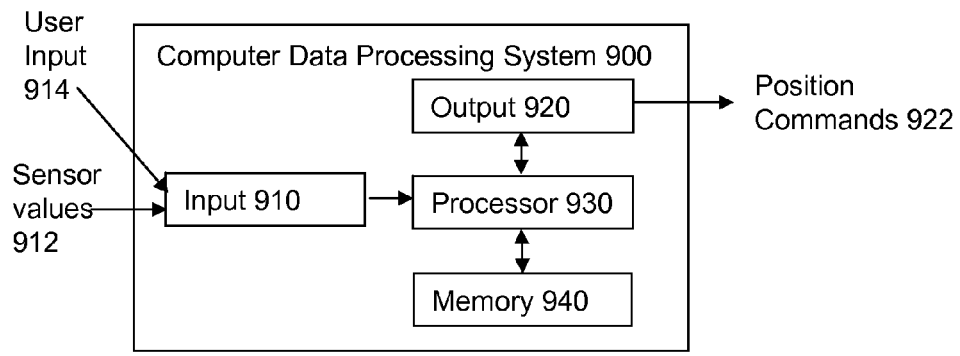
Figure 1b Robot Computer
Figure 1c Robot System
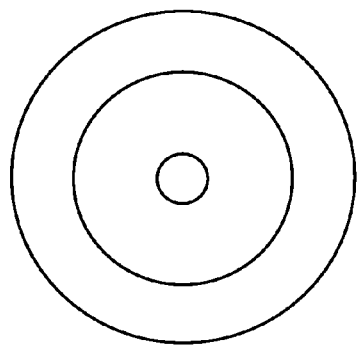
Figure 1d Computer Program Product on Compact Disk or other medium

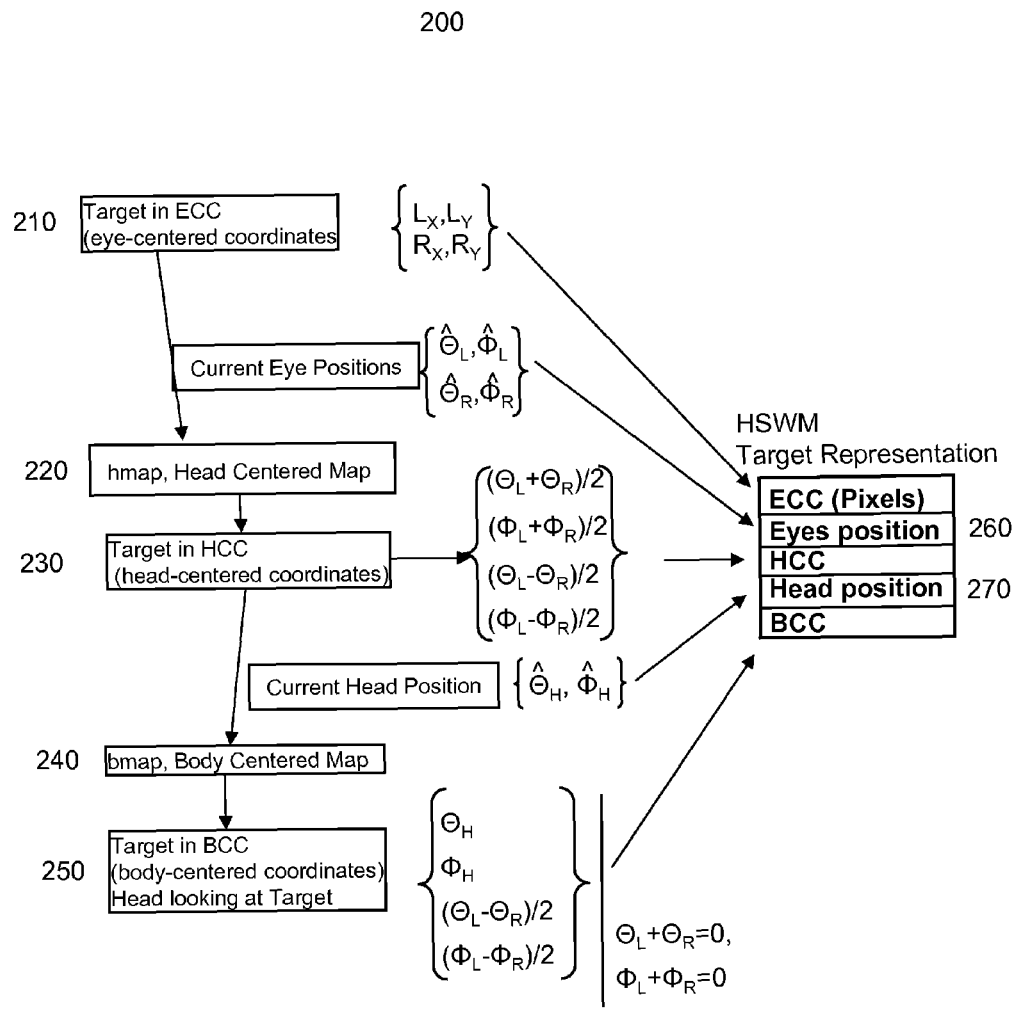
Figure 2: Hierarchical Spatial Working Memory.

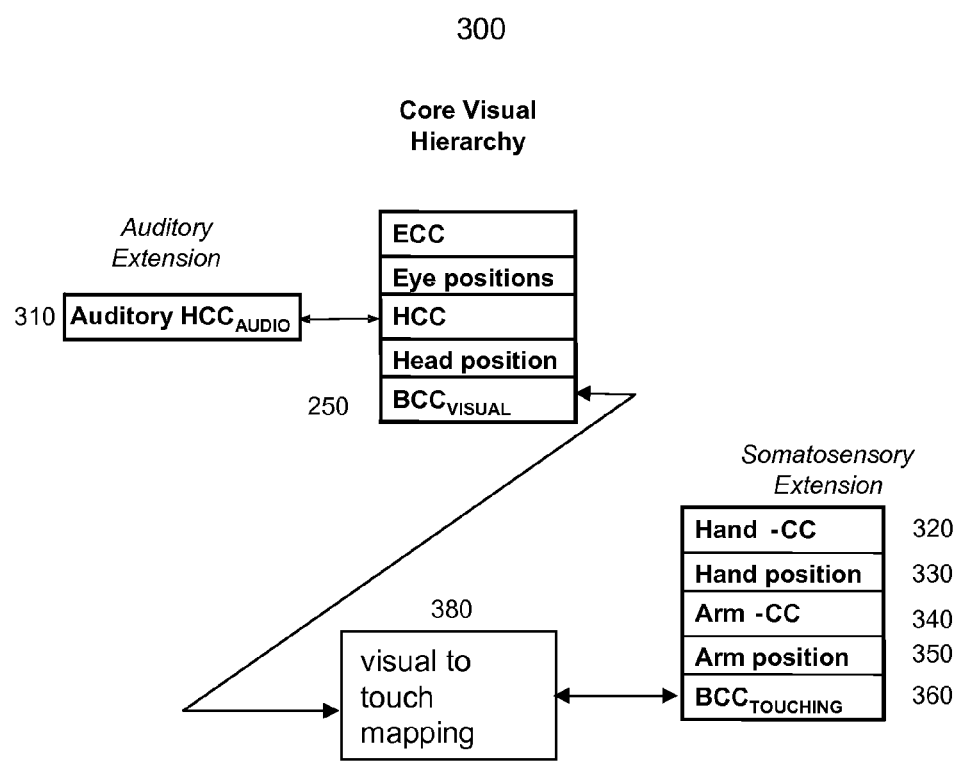
Figure 3: Multimodal extensions to the core representation hierarchy.

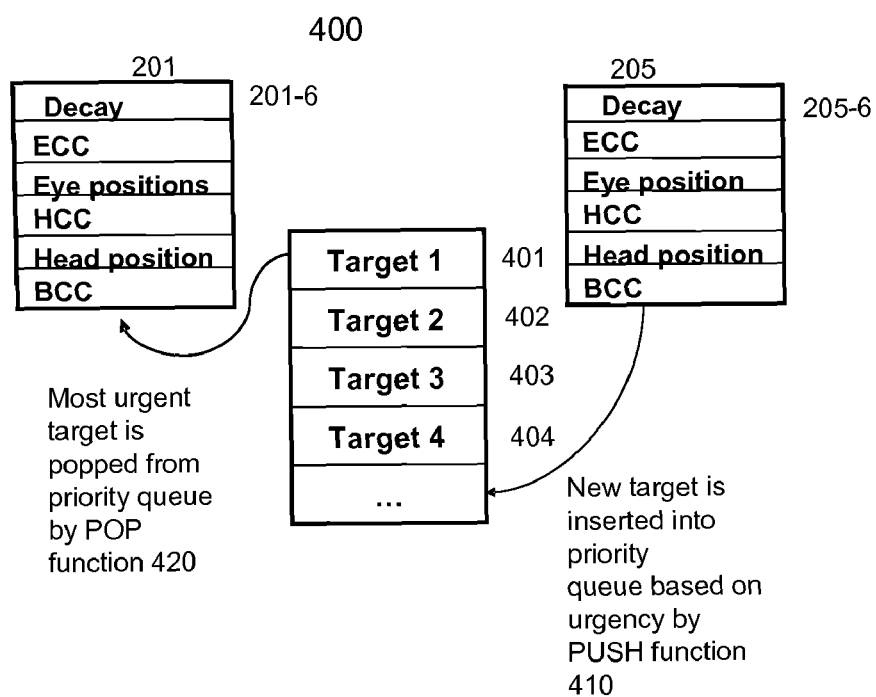
Figure 4: Multiple targets in the format of 200.

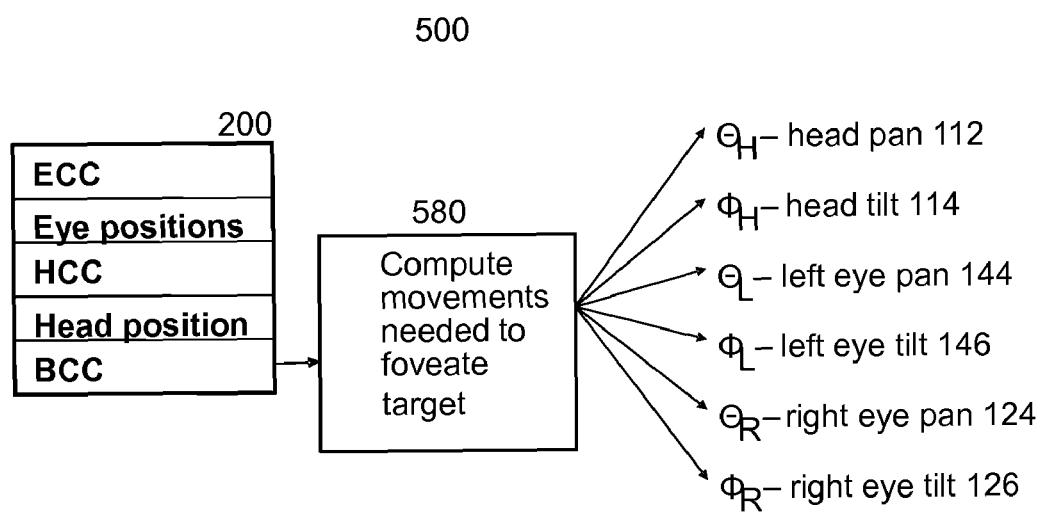
Figure 5: Computing the eye and head movements

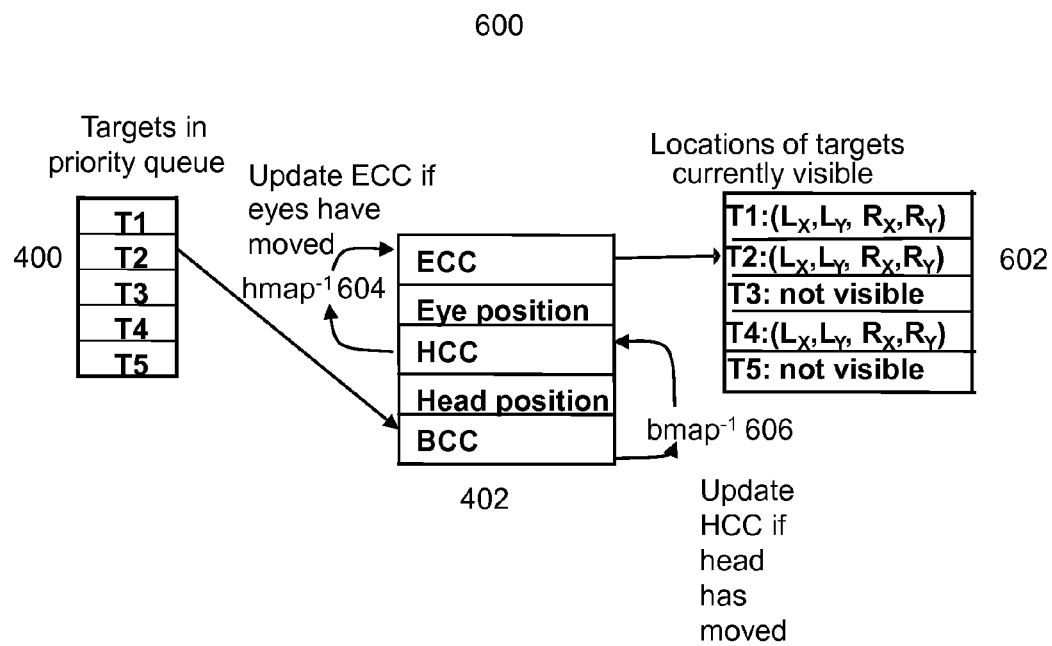
Figure 6: Generating pixel location predictions of targets in working memory.

700

| 1 | Choose N Random Targets $T_i$ in Visible Area with an $ECC_i$ for each |
| --- | --- |
| 2 | Estimate $HCC_{est}$ for each target given current hmap and $ECC_i$ |
| 3 | For Each Target $T_i$, i = 1 to N |
| 4 | Foveate on the Target $T_i$, compute $HCC_{true}$ |
| 5 | Update hmap using LWPR, $HCC_{true}$, $HCC_{est}$ of all targets seen |
| 6 | Update $HCC_{est}$ for each Target $T_i$ using ECCi and latest hmap |
| 7 | End for |
| 8 | Has LWPR converged? If not repeat steps 1-7 with more targets |
| 9 | LWPR converged, Save hmap |

Figure 7. Method of Learning Mapping HMAP

800

| | |
|---|---|
| 1 | Select N Targets $T_J$, uniformly distributed in Field of View |
| 2 | While the head is not looking directly at Target collect M training points |
| 3 | Move head by delta |
| 4 | Foveate with eyes, get $Hcc_{est,}$ Head Angles $\Theta_H$, $\Phi_H$ |
| 5 | Estimate Bcc and save $Bcc_{est}$, $Hcc_{est}$, $\Theta_H$, $\Phi_H$ as Training Point I for target J |
| 6 | End While (Head looking directly at target J) |
| 7 | Derive Actual Bcc for target J |
| 8 | Update Bmap with LWPR, Bcc Actual and set of M Training Points |
| 9 | Convergence of LWPR algorithm? |
| 10 | If no convergence, select new target, repeat 2-9 |
| 11 | Save Bmap |

Figure 8. Method of Learning Mapping BMAP

HIERARCHICAL SPATIAL REPRESENTATION FOR MULTIMODAL SENSORY DATA

RELATED APPLICATIONS

"Visual Attention and Object Recognition System" (application Ser. No. 11/973,161 filed Oct. 4, 2007

BACKGROUND

Conventional robot control techniques process sensor data using classical mechanics, kinematics and closed loop control. The result is then used to generate robot motor commands to position the robot or manipulator for further action. Robot control through conventional techniques requires frequent evaluation of trigonometric functions which can be burdensome on the computers controlling the robot. In addition, closed loop control generally requires position sensors such as resolvers or encoders; these sensors usually require calibration with changes in the environment or in hardware. Finally, conventional robot control requires a target position to be mapped into a realizable set of servo commands.

An alternative robot control concept for processing sensor data and generating commands based on research in neural nets offer advantages in faster processing owing to simpler data representations and simpler command mechanisms without position sensors. These concepts result in human like hierarchical spatial representations of sensory data in machine memory. The techniques attempt to mimic the operation of the human brain in robot control. The resulting techniques allow open loop control sensors and actuators.

Previous work has taken two forms. The first is a computational model of the human saccadic system and associated spatial representations. The purpose of these models was to verify neuroscientific theories about brain function by reproducing experimental data. Many details of these models are not needed to build a robust system for robot control. Eliminating the reproduction of experimental data purpose of the model allows distilling these models down to the essentials, resulting in fast, simple, and robust spatial coordinates systems that can be used for invariant internal representations of external objects. Additionally, these representations can be used to drive eye and head movements for accurate foveation. The representation of a target is the commands necessary to place the target centered in a particular frame of reference.

The second form of previous work that relates to the present apparatus and method is robot control based on learning mappings of sensory data to motor/joint spaces. This is open loop control in that generated motor commands does not depend on motor or joint position measurements. The advantage is the robot processor does not have to calculate the commands to achieve pointing based on target position. The most successful work of this form uses methods for learning inverse kinematics for mapping pixel positions in binocular camera input to the changes in neck and eye joints necessary to foveate a target.

There is a disadvantage or characteristic in the previous work that affects robot control. The purpose of previous work was to develop computational models that reliably recreated the behavior of real biological systems. The same characteristics of a successful model can be a hindrance to a robotic active vision system. First, the models are based on neural networks, and, therefore, assume efficient massively distributed computational resources. Actual robots may be better controlled by a small number of centralized processors. Second, the models contain various auxiliary modules that correspond to specific brain regions. The modules contribute to the computations in the same way that the corresponding brain regions do in biology. While necessary for a realistic model, these add unnecessary complexity to a robotic control system. Finally, the methods used in these models for learning are based on adaptive neural learning. Much faster and more robust "non-bio-inspired" methods exist in the machine learning literature.

An issue that can complicate these models is the fact that eye muscles and neck muscles move at speeds that differ by an order-of-magnitude or more (Tweed 1997). For the present apparatus and method to control servo-based robotic systems, it must adjust the existing techniques to accommodate the fact that a robot's servo "muscles" can all move at roughly the same speed.

Additional prior work is related to other "biologically-inspired" methods for robotic active vision control. These methods typically learn how to accurately foveate a visible target with inverse kinematics. They employ state-of-the-art online learning methods to learn a mapping of eye pixel coordinates to motor commands (Cameron 1996; Shibata et al. 2001; Vijayakumar et al. 2002). Although these methods are effective at learning to saccade quickly, they do not translate to an invariant target representation.

Other prior work has dealt with body-centered, movement-invariant representations for a robotic working memory (Peters et al. 2001; Edsinger 2007). The limitations of this work relate to the fact that it uses a "flat" or single point of view representation, instead of the multi-leveled hierarchy. These limitations are driven by storing all target information at the body-centered level. By storing all targets in a single coordinate representation, the system must perform many redundant translations in order to perform computations in other coordinate representations. This can slow down reaction time and introduce errors. As important, different control objectives may be achieved easier in one control frame than others. By limiting target representations to a single body-centered level, the system lacks the ability to easily perform computations or reasoning in the most advantageous coordinate representation.

The previous work in computational neuroscience has developed detailed computational models for the brain's spatial representation hierarchy (Greve et al. 1993; Grossberg et al. 1993; Guenther et al. 1994). These models imitate the way the brain combines stimulations on individual eyes into an "ego-centric" representation, which is then mapped into an eye-invariant, head-centered coordinate system (Greve et al. 1993; Grossberg et al. 1993). Likewise, further models describe how the brain maps head-centered representations into a head-invariant, body-centered coordinate system (Guenther et al. 1994).

The work of Grossberg et al. describes the spatial representations necessary, but not in a way that can be implemented efficiently on a real robotic system. Schaal's work on learning inverse kinematics can control reactive eye and head movements, but lacks the ability to preserve information about the target in an invariant representation. Finally, the work of Peters provides an invariant representation, but one that is not amenable to tasks, like eye movements, that must take place in different coordinate systems.

There is a need for target representations and a control methodology that allows simpler control methods without position sensors and complicated closed loop control.

LIST OF CITED LITERATURE REFERENCES

The following references are cited throughout this application. For clarity and convenience, the references are listed herein as a central resource for the reader. The following references are hereby incorporated by reference as though fully included herein. The references are cited in the application by referring to the corresponding first named author.

Cameron, S. A. 1996. Self-organizing neural networks for visual navigation and adaptive control. Boston University.

Edsinger, A. 2007. Robot Manipulation in Human Environments. Massachusetts Institute of Technology. http://dspace.mit.edu/handle/1721.1/35727.

Greve, D., S. Grossberg, F. Guenther, and D. Bullock. 1993. Neural representations for sensory-motor control, I: Head-centered 3-D target positions from opponent eye commands. *Acta Psychol (Amst)* 82, no. 1-3: 115-38.

Grossberg, S., F. Guenther, D. Bullock, and D. Greve. 1993. Neural representations for sensory-motor control, II: learning a head-centered visuomotor representation of 3-D target position. *Neural Networks* 6, no. 1: 43-67.

Guenther, F., D. Bullock, D. Greve, and S. Grossberg. 1994. Neural Representations for Sensory-Motor Control, III: Learning a Body-Centered Representation of a Three-Dimensional Target Position. *Journal of Cognitive Neuroscience* 6, no. 4: 341-358.

Peters, R. A., K. A. Hambuchen, K. Kawamura, and D. M. Wilkes. 2001. The Sensory EgoSphere as a Short-Term Memory for Humanoids. *Proc. of the IEEE-RAS Int'l Conf. on Humanoid Robots:*22-24.

Shibata, T., S. Vijayakumar, J. Conradt, and S. Schaal. 2001. Biomimetic oculomotor control. *Adaptive Behavior* 9, no. 3/4: 189-208.

Tweed, D. 1997. Three-Dimensional Model of the Human Eye-Head Saccadic System. *Journal of Neurophysiology* 77, no. 2: 654-666.

Vijayakumar, S., A. D'souza, T. Shibata, J. Conradt, and S. Schaal. 2002. Statistical Learning for Humanoid Robots. *Autonomous Robots* 12, no. 1: 55-69.

SUMMARY

The present apparatus and method describes a robot's vision system using a biologically-inspired hierarchy of spatial representations specifically designed for multimodal sensor (or perceptual) inputs that can meet the targeting goals of acting upon these inputs. These goals include fast and accurate responses, a movement-invariant memory of spatial locations, and the ability to adapt to changing personal and environmental parameters. The present apparatus and method is intended to be implemented in a computer for robot control. This representation hierarchy, called a Hierarchical Spatial Working Memory, and the processing methods that maps between target representations make up the primary contributions of the inventors. An additional part of the apparatus and method herein is a set of fast and simple training scenarios that allow this method to be employed on a variety of robotic architectures. The scenario invokes a standard Locally Weighted Projection Regression method to develop the mappings from one spatial representation to another rather than use mappings based on geometry and trigonometry.

Given information about a target location, the next logical task is developing the commands to focus on the target. By choosing the target representation in terms of commands to foveate the target or point the head at a target instead of classical vector representations—a simpler, faster method for identifying the mapping between data representations in a sensor frame and a body frame can be implemented.

The present method extends efforts to develop mappings between brain-like internal spatial representations and targets, instead of inverse kinematics. In addition to learning how to execute accurate saccades, as the inverse kinematics methods did, the spatial hierarchy of the present method preserves information about where a target is in relation to the robot. This gives the robot an intuition about where and what a target is that cannot be achieved from a simple pixel-to-motor mapping. Additionally, this method is more robust to unpredictable changes in the external environment as well as the robot's own motor parameters.

DESCRIPTION OF THE DRAWINGS

The objects, features and advantages of the present invention will be apparent from the following detailed description of the preferred embodiment of the invention in conjunction with reference to the following drawings where:

FIG. 1a shows the basic geometry of the robot. This is not meant to be limiting of the apparatus and method herein but a representation for the reader that relates the detailed description under the heading Robot Description to a physical device for ease of understanding.

FIG. 1b illustrates the computer for controlling the robot and executing the methods defined by this application.

FIG. 1c illustrates the relationship between the computer 900, the robot 100 and the target 130

FIG. 1d illustrates a computer readable medium storing a computer program product embodying the methods defined by this application. The means for representing at least one target by a plurality of coordinate representations, sensor values and angle commands collectively are programmed according to the description herein and stored on the computer readable medium.

FIG. 2 illustrates a single target in Hierarchical Spatial Working Memory.

FIG. 3 illustrates the Core Visual Hierarchy augmented with audio and somatosensory extensions.

FIG. 4 shows the Hierarchical Spatial Working Memory implemented with a priority queue.

FIG. 5 illustrates the commands necessary to foveate a target.

FIG. 6 illustrates the process of converting a set of targets in memory to eye commands.

FIG. 7 illustrates the method of computing the hmap from a set of targets in a training scenario.

FIG. 8 illustrates the method of computing bmap from a set of targets in a training scenario.

DESCRIPTION

The present invention is directed to methods of representing sensory data that facilitate robot control and to training methods for learning robot control.

The following description is presented to enable one or ordinary skill in the art to make and use the invention and to incorporate it in the context of particular applications. Various modifications, as well as a variety of uses in different applications will be readily apparent to those skilled in the art, and general principles defined herein may be applied to a wide range of embodiments. Thus the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All features disclosed in this specification, (including any accompanying claims, abstract, and drawings) may be replaced by alternative features serving the same, equivalent or similar purpose, unless expressly stated otherwise. Unless expressly stated otherwise, each feature disclosed is one example only of a generic series of equivalents or similar features.

Any element in a claim that does not explicitly state "means for" performing a specified function, or "step for" performing a specific function, is not to be interpreted as a "means" or "step" clause as specified in 35USC Section 112, Paragraph 6. In particular, the use of step of or act of in the claims herein is not intended to invoke the provisions of 35USC Section 112 Paragraph 6.

The present invention will be described with reference to the accompanying drawings. This invention may be embodied in many different forms and should not be construed as limited to the embodiments set forth herein. Further, the dimensions, materials and other elements shown in the accompanying drawings may be exaggerated to show details. The present invention should not be construed as being limited to the dimensional or spatial relations or symmetry shown in the drawings, nor should the individual elements shown in the drawings be construed to be limited to the dimensions shown.

Glossary

BCC—body centered coordinates. The location of a target invariant to motions of the head or eyes bmap—mapping a position known in Head Centered Coordinates into Body Centered Coordinates. bmap$^{-1}$ is the mapping from Body Centered Coordinates to Head Centered Coordinates.

ECC—eye centered coordinates, the pixel coordinates of a target in a camera's view.

Foveate—to center a target in the field of view of each camera by pointing the cameras at the target.

HCC—head centered coordinates. The location of a target invariant to motion of the eyes. The head pan and tilt angles needed to point the head at the target.

hmap—mapping a position in Eye Centered Coordinates into Head Centered Coordinates. hmap$^{-1}$ is the mapping between Head Centered Coordinates and Eye Centered Coordinates.

HSWM—Hierarchical Spatial Working Memory. The set of target position representations that include eye, head and body coordinates LWPR—Locally weighted projection regression. A method for learning the mapping between an input and an output.

Saccades—Commands to accurately center a target in the field of view of the sensor. Rapid eye movement to focus the eyes on a target.

Somatosensory—information derived from other than visual or auditory sensors, e.g. touch or rangefinders.

Target—item of interest in the field of view of the camera.

Verging—commanding the head and/or eyes such that the target is centered in each of two eyes. The vergence angle is the included angle between the gazes of each eye is a measure of the distance from the eyes to the target.

Robot Description 100

FIG. 1a illustrates the relationship between the eye cameras 120 and 140, the head 110 and the body represented by axes X 102, Y 103, and Z 104 of a typical robot 100.

Eyes

The eyes of a robot are usually cameras but may be other sensors. The eye cameras 120 & 140 generate pixels of the target 130 location in the field of view of the cameras 120 & 140. The target 130 location in the camera 120 & 140 frame can be represented as the horizontal and vertical pixel count. For purposes of this description but without implying a limitation of the present invention, a target 130 centered in the eye cameras 120 & 140 gives zero pixel counts. Each eye camera 120 & 140 can pan 124 & 144 and tilt 126 & 146, respectively, to point the eye camera 120 & 140 at the target 130. The pan 124 & 144 is the azimuth angle and the tilt 126 & 146 is the elevation angle. The pan and tilt angles 124, 144, 126, 146 may be sensor values or commands to achieve a desired pan or tilt angle.

A different camera system may give non zero pixel counts for targets centered in the field of view but that only means a change of reference to calculate a zero-zero centered target.

The robot 100 is controlled by a computer 900 as shown in FIGS. 1b and 1c. The methods and programs implementing this invention can be embodied physically in many forms. FIG. 1d shows one non limiting example of a compact disk.

Eye Centered Coordinates

The Eye Centered Coordinates (ECC) of a target are considered to be the primary input to the representation hierarchy. A target is identified for example as shown in "Visual Attention and Object Recognition System" (application Ser. No. 11/973,161 filed Oct. 4, 2007 and incorporated by reference in its entirety) in terms of its pixel location in a left and right eye camera image, $L_x$, $L_y$, $R_x$, and $R_y$ respectively. Without loss of generality, the pixel values are zero when a target is centered in the field of view of an eye. The x-y pixel coordinates in each image are combined to create a four-element vector, 210 in FIG. 2. This is considered a representation of the target location in eye-centered coordinates. In addition, the current pan and tilt angles of each eye are also saved as part of the Hierarchical Spatial Working Memory. As long as the system does not move, i.e. neither the eyes nor the head move, this is an accurate representation of the target location in space. As soon as either eye or the head moves, the prior pixel coordinates no longer correspond to the same location in space. Given a robot vision system will likely require eye and head movements, a need exists for alternate-level representations that are invariant to these movements.

Head

The head 110 of a typical robot may have independently gimbaled and controlled eye cameras 120 & 140. The eye cameras 120 & 140 are mounted in a plane that defines the head such that when the pan and tilt angles of the eye cameras 120 & 140 are zero each eye camera 120 & 140 is staring along a vector normal to the plane of the head. The head 110 itself may be gimbaled and controlled with respect to the body (102-104). The head may rotate in azimuth $\Theta_H$ 112 or pan and it may rotate in elevation or tilt $\Theta_H$ 114. The head pan and tilt angles 112, 114 may be sensor values or commands to achieve a desired pan or tilt angle 112, 114. When the head is pointing at the target a vector originating at the mid point between the eye cameras 120 & 140 and ending at the target is normal to the plane of the head 110.

The head 110 of a typical robot may be fixed, for example where the eye cameras 120 & 140 are mounted on a wall of a room. In this embodiment the head cannot point at the target so the body centered coordinate representation is zero or not used. The head 110 in FIG. 1*a* shows two eye cameras 120 & 140 without implying any limitation on the number of eye cameras or sensors. For example, additional cameras may be used to provide additional information for calculation of vergence angles.

Head Centered Coordinates

The second level in the visual core hierarchy is Head Centered Coordinates (HCC), which are based on the positions of the eye cameras 120 & 140 required for the target location to be centered in both eye cameras 120 & 140. This representation is invariant to eye position, because, regardless of the current positions of the eye cameras 120 & 140, the HCC tells us how they would be positioned if the target was centered in the eye cameras 120 & 140. Construction of HCC is based on that described by (Greve et al. 1993; Grossberg et al. 1993; Guenther et al. 1994). Assume that each of the eye camera 120 & 140 gimbal angles are represented by a value from −1 to +1. For example, the pan angles 124 and 144 of the eye cameras 120 & 140 are −1 if the eyes are looking to the extreme left, and they are +1 is they are looking to the extreme right. They are looking straight ahead when the pan angles 124, 144 are zero. Likewise, for tilt angles 126, 146, −1 corresponds to looking down and +1 corresponds to looking up. Let $\Theta_L$ and $\Theta_L$, be the left eye camera 140 pan 144 and tilt 146, respectively, while the target is centered, $L_X$, $L_Y$, $R_X$, $R_Y$=0 and let $\Theta_R$ and $\Phi_R$ be the right eye camera 120 pan 124 and tilt 126, respectively. Borrowing notation from (Greve et al. 1993; Grossberg et al. 1993; Guenther et al. 1994), HCC is a four element vector H=⟨$h_1$, $h_3$, $h_5$, $h_7$⟩. The elements $h_1$ and $h_3$ correspond to a head-centered, ego-centric pan 112 ($\Theta_H$) and tilt 114 ($\Theta_H$), respectively. They are computed as follows.

$$h_1 = \frac{\Theta_L + \Theta_R}{2}$$

$$h_3 = \frac{\Phi_L + \Phi_R}{2}$$

These give the pan 112 and tilt 114 angles respectively of a line coming out of the midpoint between the eye cameras 120 & 140 and going straight to the target 130. The eye camera 120 & 140 angles used in this calculation are those when the eye cameras 120 & 140 are looking directly at the target, i.e. the pixel values are zero. Notice that $h_1$ and $h_3$ will also be between −1 and +1, with the same meaning as the eye camera angles 124, 126, 144, 146 and with the same references, i.e. if $h_1$=0, the target is on a line originating half way between the eye cameras 120 & 140 and perpendicular to the head 110. While this makes up part of the information needed to represent the target's location, there are still infinitely many points on this line where the target 130 could reside. To represent the distance of the target from the robot, the HCC 230 is populated with a representation of the vergence angle. That is, the angle at which the central focus of the two eyes converge. Again, this is similar to (Greve et al. 1993; Grossberg et al. 1993; Guenther et al. 1994). Thus, $h_5$ and $h_7$ represent the horizontal and vertical vergence, respectively, and they are computed as follows.

$$h_5 = \frac{\Theta_L - \Theta_R}{2}$$

$$h_7 = \frac{\Phi_L - \Phi_R}{2}$$

Again, notice that $h_5$ and $h_7$ can vary from −1 to +1, except that not all of this range will be realistically achieved when both eyes are looking at the same target. This is because, for example, $h_5$=−1 means the left eye camera 140 is looking totally to the left, and the right eye camera 120 is looking totally to the right. Clearly, they will not be verging in this case. The divisor in the equations for $h_1$, $h_3$, $h_5$ and $h_7$ is 2 because of the symmetry of the eye cameras 120 & 140 relative to the "nose" 102 of the head 110. Other locations of eye cameras 120 & 140 may result in the divisor being other than two. Hence in general, the components of HCC 230 are a fraction of the sum or difference of the eye camera 120 & 140 pan and tilt angles 124, 144, 126, 146 as appropriate for the geometry.

Body

The body of the robot (represented by axes 102, 103 and 104) may be considered to be the part that the head 110 is mounted on. The body may be stationary or not. For example, if the eyes 120, 140 are surveillance cameras mounted in a room, then the room is the body and the head 110 is fixed.

Body Centered Coordinates

The third level in the core representation hierarchy is Body Centered Coordinates (BCC), which is based on the head position and eye vergence necessary to center the target in both eye cameras while the eye cameras 120 & 140 are looking as straight ahead as possible. It is easy to compute the BCC 250 of a target 130 if both eye cameras 120 & 140 are looking at the target 130 and a line coming straight out of the midpoint between the eye camera 120 & 140 intersects the target 130. Recall that a line originating from the midpoint between the eye cameras 120 & 140 defines $h_1$ and $h_3$. Thus, one can directly compute the BCC 250 of a target if both eye cameras 120 & 140 are looking at it, $h_1$=0 and $h_3$=0. Like HCC 230, BCC 250 is represented by a four-element vector B=⟨$b_1$, $b_3$, $b_5$, $b_7$⟩. Let $\Theta_H$ and $\Phi_H$ be the head joint's pan 112 and tilt 114, respectively. Assuming that the target 130 is centered in both eye cameras 120 & 140, $h_1$=0, and $h_3$=0, the BCC 250 is computed as follows.

$$b_1 = \Theta_H$$

$$b_3 = \Phi_H$$

$$b_5 = h_5$$

$$b_7 = h_7$$

Notice that $b_1$ and $b_3$ are the head commands/angles needed so that the eye cameras 120 & 140 can center the target while $h_1$=0, and $h_3$=0. Also, $b_5$ and $b_7$ are the same as $h_5$ and $h_7$, because the vergence angle and distance to the target 130 are the same, regardless of the head 110 position.

The equations given above tell one how to compute the BCC 250 of a target 130 when it is directly in front of the robots "face".

Control Signals

As shown in FIG. 2, target representations in eye 210, head 230 and body centered 250 coordinates aid appendage control. The eye cameras 120 & 140 and head 110 accept open loop position commands to point the eye cameras 120 & 140 and head 110. These position commands are in lieu of gimbal angle measurements that are then used to compute motor commands to achieve the desired or commanded angle. Hence an eye camera's (120 or 140) pan (124 or 144) or tilt (126 or 146) angle is the last command to the eye camera (120 or 140) servo or the command to the eye (120 or 140) to achieve the desired pan angle (124 or 144). The head pan 112 and tilt 114 angles are similar in that they are commands to point the head 110 in a particular direction. The reader may think of this notional robot as possessing servos that achieve the commanded angle without error. As such there is no difference between actual and commanded positions.

One method of controlling the robot 100 has the computer data processor 900 compute closed loop control commands to center a target 130 in the field of view of the eye cameras 120 & 140. An alternative method has the computer 900 learn and remember the open loop commands 922 to center the target 130 in the field of view of the eye cameras 120 & 140. One advantage of the later method is that the computer 900 is not programmed with an inverse kinematic model. Another is that the computer 900 does not need measurements of joint or gimbal angles. Instead of a target 130 being defined by a vector derived trigonometrically, the target 130 becomes defined by the commands 922 necessary to place the target 130 in the field of view of the eye cameras 120 or 140.

One implication of the latter approach is the robot's computer 900 preferably learns the mapping from a target 130 location to the commands necessary to point the robot 100 at the target 130 since these equations may not be programmed in.

Another implication is target 130 position is not maintained in a traditional geometric sense. As such, one can not convert a target 130 position in one frame of reference to another easily. Hence the target 130 location has to be learned in each frame of reference desired or mappings are preferably learned between the frames of reference.

The computer receives sensor data such as pixel locations of a target, angles of eye cameras 120 & 140, and head 110. The computer populates the Hierarchical Spatial Working Memory 200 for each target 130 with the known coordinates and generates mappings between data representations.

Hierarchical Spatial Working Memory (HSWM) for a Target

The Hierarchical Spatial Working Memory 200, shown in FIG. 2 is a visual core representation hierarchy that encodes the location of a target in space in multiple coordinate representations and in terms of a camera sensor's required commands or orientation such that the target is centered in the camera images. Given a target in the field of view of the eye cameras, the HSWM may be populated first with the current pixel values, then the eye cameras 120 & 140 are moved such that the pixel values are zero. The last pan 124, 144 and tilt 126, 146 angles become the arguments for the HCC. Finally, the head is moved. Alternatively, if the mappings from eye centered coordinates to head centered coordinates (hmap 220) and from head centered coordinates to body centered coordinates (bmap 240) are known then the target position in head and body centered coordinates may be computed.

The HSWM 200 includes target representations that are invariant to movement and representations that change with head or eye movement. The visual core hierarchy can be extended to include target representations in other coordinate representations. The motivation for this is that different target representations at different points in the hierarchy are needed for different goals. First of all, sensor data comes in different forms from different sources. One differentiating aspect of these different input forms is the particular movements they are dependant on and invariant to. For example, auditory localization data is invariant to movements of eye cameras, arms, and other appendages, though the audio derived target location will vary as the head moves. Although the HSWM is described in terms of cameras as eye cameras, the reader skilled in the art will appreciate other sensors may be substituted or added such as radars, laser range finders, millimeter wave imagers, or microphones.

The HSWM 200 may be thought of as accommodating an active vision robot 100 with two independent eye cameras 120 & 140 on a movable head 110. The visual core of this multimodal hierarchy are the eye and head positions necessary to center a target 130 in the eye cameras 120 & 140. The head positions are those necessary to point the "nose" at the target. This is captured in the BCC 250. An implementation will also include simple and versatile methods (Push and Pop off the stack of targets) for incorporating targets encoded in the representations into a working memory.

FIG. 2 shows a schematic of the hierarchical structure of the Hierarchical Spatial Working Memory 200 as it would be represented in a computer. Each target is represented by a set of Eye Centered Coordinates (ECC) 210, a set of Head Centered Coordinates (HCC) 230 and a set of Body Centered Coordinates (BCC) 250. In addition, the current position of the eye cameras 260 and head 270 are saved. A mapping function 220 is needed for converting ECC to HCC and another mapping 240 to convert HCC to BCC. These mappings accommodate changes in system parameters. However, since only one mapping 220 is needed for ECC to HCC and another 240 from HCC to BCC, these mappings do not have to be saved with each target. One skilled in the art will appreciate that the various data elements do not have to be stored in contiguous memory as long as any program needing the data can access it. Moreover, a person skilled in the art will realize that alternative robot configurations and designs may call for more or fewer coordinate representations and mappings.

Multimodal Extensions to the Hierarchy

While the Hierarchical Spatial Working Memory 200 shown in FIG. 2 is constructed and interpreted in terms of visual inputs and commands required to visually center a target, it can easily be extended to incorporate sensory data from other sources. FIG. 3 shows a sample of how auditory 310 and somatosensory 320-350 data can augment the representation hierarchy. Just as mappings 220 & 240 are used to traverse the Hierarchical Spatial Working Memory 200, additional mappings 380 are used to integrate other sensor data to the core. The details of how auditory 310 and somatosensory 320-350 data are gathered and processed are beyond the scope of this specification, though, this section includes a description of how they can be interfaced to the core visual hierarchy.

Auditory localization is frequently accomplished with two microphones as "ears" fixed to a robotic head 110. Practitioners and developers of robot control methods know techniques exist for determining horizontal and vertical offset angles of a target 130 source relative to the center of the robot's head 110. This "head-centered" coordinate representation $HCC_{AUDIO}$ 310 is different from the HCC 230 used in the visual core hierarchy of the present specification. For one, it does not inherently relate to eye camera positions. Also, it does not contain information about the distance to the target 130. Thus to transform a target 130 represented in this auditory head centered coordinates ($HCC_{AUDIO}$ 310) to the visual core HCC 230 an estimate of distance and a mapping is required. The first two entries in the visual core HCC 230 are the average horizontal and vertical joint angles of the eye cameras. Clearly if a mapping can be learned that transforms target location in the ECC 210 coordinates to a target location in the HCC 230 and BCC 250 coordinates, then a mapping from audio coordinates into the same pointing angles of an auditory $HCC_{AUDIO}$ 310 can also be learned. If the auditory system has a way to estimate target distance, a mapping can also be learned to convert the target distance to horizontal and vertical vergence angles $h_5$, $h_7$. Alternatively, these variables can be given uncertain initial estimates to be updated when more information is acquired. For example, they can be initially estimated to be some reasonable distance away. Then the robot can be instructed to look at that estimated target. Once it becomes visible these values can be updated.

Another possible extension of the hierarchy shown in FIG. 3 incorporates a complete somatosensory hierarchy at the body-centered level, elements 320-350. Through means similar to constructing the visual hierarchy, a somatosensory hierarchy is constructed that represents the position of a target relative to a hand 320, an arm 340, and the center of the body 360. The body-centered coordinate 360 here is not based on the joint angles required to see a target 130, but instead the joint angles 330 and 350 required to touch or point to a target 130. By both looking at and touching a target 130 simultaneously, a mapping can be learned that converts between these two disparate body-centered coordinate representations 250 and 360. The term somatosensory refers to sensory information other than visual or audio. Touch is one example of somatosensory information. Smell, chemical sensor outputs, biological sensor outputs and laser range finders are other, non limiting, examples of somatosensory data that may be integrated in the HSWM 200.

By building accurate mappings to and from extensions of the visual core of the HSWM 200, one can store a simple representation of a target 130 and yet transform it into whatever representation is required for a given application. This also allows the various joints 330 and 350 to be moved without losing information about the target's whereabouts.

Multi Target Hierarchy Spatial Working Memory

The HSWM 200 can be extended to multiple targets. For example, if a number of salient targets 401 to 404 are identified, the HSWM for each target in FIG. 4 can be used to look at each of them in turn. The MultiTarget HSWM 400 (MT-HSWM) can be augmented for different tasks by adding supplemental data structures. If an urgency function that maps targets to urgency values is defined, it can be used to sort a priority queue of existing targets 400. FIG. 4 shows an example of how a priority queue-based MultiTarget HSWM would work. Additionally, a decay 201-6 can be added and set that will allow targets to be forgotten after some amount of time.

There are a set of queries and operations of the MT-HSWM that can be useful. First and foremost is a pop functionality that returns a target representation 201 from the MT-HSWM 400, as is shown in FIG. 4. This target representation 201 can be the focus of some action, such as looking at or grabbing it.

An example of the movements that need to be computed to look at the target 130 is shown in FIG. 5. In this example, the BCC 250 target representation is used to compute the pan 112 and tilt 114 of the head and each eye 144, 124, 146 126. The details within the block 580 to calculate eye camera 120 & 140 pointing angles from target 130 location is a well known exercise in geometry. For example, the first two elements of BCC 250 are the head pan 112 and tilt 114 angles to point the head 110 at the target 130. From the constraint that h1=h3=0 because the eye cameras 120 & 140 are looking at the target 130, hence $\Theta_R=-\Theta_L$ and $\Phi_R=-\Phi_L$. Clearly this can be adapted for robots with a somewhat different joint, eye or head configuration. The resulting angles, once the movements are made, should have the robot 100 looking at the target 130, with the center of its head 110 (say, where the nose would be) pointing directly at the target 130. The eye cameras 120 & 140 will also be verging onto the target 130.

Another important query is the ability to identify targets currently in view by traversing the representation hierarchy for targets in the MT-HSWM. This can be used to identify the current ECC 210 of targets in the MT-HSWM 400. An estimate of the location of a target 130 corresponds to the eye-centered coordinate representation given the current positions of the robot's eye cameras 120 & 140 and head 110. Thus, if the robot's eye cameras 120 & 140 and head 110 have not moved since a given target 130 was initially identified, then the stored ECC 210 is sufficient. In most cases, the targets 400 stored in working memory will have been identified with many different eye and head positions. FIG. 6 illustrates how the current ECC 210 of these targets can be computed. Since BCC 250 is invariant to both eye and head movements, this value is stable and is the place where the conversion begins. If the stored head position is different than the current head position, because the head has moved since the target was identified, then the HCC 230 representation of the target must be updated. This is done with an inverse mapping from BCC 250 to HCC 230, bmap$^{-1}$ 606. This up-to-date HCC 230 is now stored along with the current head position. Next, an inverse mapping, hmap$^{-1}$ 604, from HCC 230 to ECC 210 updates the ECC 210 representation as well as the current eye position. If the target's ECC 210 falls within the eye camera 120 & 140 images' pixel range, then the target 130 is currently visible to the robot 100. When visible, these pixel coordinates are outputted so that they can be used as described above. If they are not visible, then the robot's computer 900 simple reports this fact.

Mapping from Eye Centered Coordinates to Head Centered Coordinates

While the equations given above are sufficient to calculate the HCC 230 representation of a target 130 centered in the field of view of each eye camera 120, 140 of the robot 110, one needs to find the HCC 230 of any target 130 visible to both eye cameras 120 & 140 not necessarily centered. As shown in FIG. 2, hmap 220 provides the mapping to convert any target 130 in the field of view of the robot's eye cameras 120 & 140 to HCC 230. Let $\hat{E}$ be the ECC 210 representation of the target, H is the HCC 230 representation of the currently foveated point, and $\hat{H}$ is the HCC representation of $\hat{E}$ to be computed. The mapping hmap 220 (head-centered map in FIG. 2) is used to compute the HCC 230 representation of the current target.

$$\hat{H}=\text{hmap}(\hat{E})+H$$

Mapping from Head Centered Coordinates to Body Centered Coordinates

Similar to the preceding paragraph, the mapping bmap 240 will generate the body centered coordinate BCC 250 of a target 130 for a given head centered coordinate HCC 230, as shown in FIG. 2. Given HCC 230 and bmap, BCC 250 is computed as follows: Let $\hat{H}$ be the HCC 230 of the new target 130, let B be the BCC 250 of the current position, and let $\hat{B}$ be the BCC representation of the new target 130. $\Theta_H$ and $\Phi_H$ are the pan 112 and tilt 114 angles respectively of the current head position and assumed independent. The mapping, bmap 240 (body-centered map in FIG. 2), gives the values needed.

$$\hat{B}=\text{bmap}(\hat{H},\Theta_H,\Phi_H)+B$$

Method of Learning BCC and HCC Mappings Through Training

There are a variety of existing machine learning techniques that can be used to learn the mappings between representations and to allow traversal of the hierarchy. One effective online learning method is called locally weighted projection regression (LWPR). LWPR was created by Vijayakumar et al. in 2002. Any online learning method that can learn functions with the dimensions defined herein will suffice as a black box learning method for purposes of this method. Thus, a reference to LWPR means it is acceptable to substitute another qualifying learning method. FIG. 7 shows the method of learning the mapping from ECC 210 to HCC 230. The method shown can be adapted to map to and from the extensions discussed earlier such as $HCC_{AUDIO}$ 310, as well as alternative mappings hmap$^{-1}$ 604 and bmap$^{-1}$ 606. All that is needed is a scenario that supplies numerous data points including the extension representation and the corresponding coordinate representation from the core hierarchy. Also, these mappings can be updated dynamically. During the course of normal operation, any time the coordinates can be directly computed for two adjacent representations in the hierarchy, that data can be used as a training point.

The function hmap 220 maps from four dimensional input, the ECC 210 representation of a target, to a four dimensional output, the HCC 230 offset from the current HCC. The function bmap 240 maps from six dimensional input, the target's HCC 230 and the current head position $\Theta_H$ 112, $\Phi_H$ 114, to a four dimensional output, the BCC 250 offset from the current BCC. LWPR learns these maps by using the initial maps (untrained at first) to generate output estimates. The robot 100 then moves such that the actual HCC 230 or BCC 250 can be computed (by looking straight at the target 130). Given the initial estimate and the actual answer, this training point is inputted into LWPR which improves the mapping. By repeating this process the estimated mapping approximates the ideal mapping. The training scenarios shown in FIGS. 7 and 8 and are designed to allow rapid learning of the mappings.

Locally Weighted Projection Regression

HCC Mapping and Training Scenario

The scenario for training hmap 240 shown in FIG. 7 attempts to make many predictions and, therefore, generate many training points for the LWPR map in a short time. The scenario begins by choosing N targets at random from the visible area, and estimating the HCC 230 of each target with the current initial hmap 240 and ECC 210 for each target. Then one target ECC 210 is chosen and the linear controller is used to foveate that target, i.e. the eye cameras 120 & 140 are moved to center the target in each eye camera. When the target is successfully foveated the actual HCC 230 is computed, then hmap 220 is updated based on the target's estimated and actual HCC 230 using LWPR. The scenario then proceeds to the next target, estimate the HCC 230 of that target and all of the previously generated targets with the latest hmap 220. Once again, a target 130 is chosen and the linear controller is used to foveate it. And again, once foveated, hmap 220 is updated, although now there will be multiple training points: one for each target foveated with ECC 210 and a true HCC 230. Every time a target is foveated, hmap 220 is recomputed. Every time hmap 220 is updated the estimated HCC 230 is recomputed for all remaining targets. The process continues until the residual error in the LWPR is less than a user defined threshold or all targets are exhausted.

BCC Mapping and Training Scenario

A similar scenario shown in FIG. 8 is used to generate bmap 240. The difference is that the head 110 and eye cameras 120 & 140 are moved with different controllers instead of just the eye cameras 120 & 140. First a set of targets are generated, preferably uniformly distributed in the field of view of the eye cameras 120 & 140 although other distributions may be used such as Gaussian. The head 110 is unlikely to be directly looking at the target 130 at this point. A set of training points are collected while the head 110 is incrementally moved to point at the target 130. The training points are developed as follows: The head controller moves the head 110 a little, then the eye controller runs until the eye cameras foveate the target. When the target 130 is foveated, an estimate of the BCC 250 is made using the initial bmap 240 and the HCC 230 is computed along with the current head pan and tilt commands 270. This continues until the robot head 110 is "looking" directly at the target 130 and the actual BCC 250 can be computed or measured. The bmap 240 is then updated using the training points from each time the head was moved and the actual final BCC 250, with an LWPR method. The head controller and eye controller are components in the processor 930.

A fundamental tool of the training scenarios is the ability to identify a target in the eye camera 120 & 140 images after a small eye camera or head 110 movement. This allows the robot 100, without knowing how to foveate directly to a target 130, to move the eye cameras 120 & 140 or head 110 a little in the direction of the target 130 and identify how far it has to go and whether it has foveated the target 130. Normalized cross correlation, a standard technique for feature identification, is used for the identification. The technique is described in Fast Normalized Cross-Correlation, by J. P. Lewis (see http://www.idiom.com/~zilla/Papers/nvisionInterface/nip.html). After the movement, normalized cross correlation is used to find the target in the new images.

Another necessary tool is a simple controller for foveating the target 130. Such tools are known in the art. Since before the mappings are trained the robot 100 cannot foveate directly to the target 130, a simple linear controller can be used to move the eye cameras 120 & 140 or head 110 in the right direction. In one step the target is identified and a move is generated. Then normalized cross correlation is used to find the target again. The controller can now take a larger or smaller step depending on whether the target was over- or under-shot.

What is claimed is:

1. A method of learning a mapping between an eye centered coordinate representation and a head centered coordinate representation given an initial estimate of the mapping and a set of targets each with a known eye centered coordinate representation comprising:
    initializing the method by estimating the head centered coordinate representation for each target using the initial estimate of the mapping and the eye centered coordinate representation for each target;
    executing the following steps;
    a) selecting a target in a field of view of a first eye camera and a second eye camera;
    b) retrieving the eye centered coordinate representation for the target;
    c) commanding the first eye camera and the second eye camera to foveate on the target by moving the first eye camera and the second eye camera;
    d) computing the true head centered coordinate representation of the target;
    e) updating the mapping from eye centered coordinate representation to head centered coordinate representation using the true head centered coordinate representation for the target and the estimated head centered coordinate representations for all previously viewed targets;
    f) updating the estimated head centered coordinate representations for all targets previously foveated;
    g) computing the change in mapping;
    repeating steps a-g if the change in mapping is greater than a user defined threshold otherwise ending the method.

2. The method of claim 1 wherein updating the mapping is done using a locally weighted projection regression method.

3. A method of learning a mapping between a head centered coordinate representation and a body centered coordinate representation given an initial estimate of the mapping and a set of targets each with a known eye centered coordinate representation comprising:
   a) selecting a target from the set of targets in a field of view of a first eye camera and a second eye camera wherein the first eye camera and the second eye camera are pivotally mounted on a head and the head is pivotally mounted on a body;
   b) while the head is not looking directly at the target, generate a set of training points as follows;
   i) move the head by a user defined increment;
   ii) foveate on the target with the first eye camera and the second eye camera;
   iii) compute a training point as an estimated body centered coordinate representation, an estimated head centered coordinate representation, the head pan angle and the head tilt angle;
   d) repeat steps i-iii above until the head is pointed directly at the target;
   e) computing the true body centered coordinate representation for the target;
   f) updating the mapping using the true body centered coordinate representation of the target and the set of training points generated for the target;
   h) computing the change in mapping;
   repeating steps a-h if the change in mapping is greater than a user defined threshold otherwise end the method.

4. The method of claim 3 where the set of targets is substantially uniformly distributed in the field of view of a first eye camera and a second eye camera.

5. The method of claim 3 wherein updating the mapping is done using a locally weighted projection regression method.

6. A computer program product for representing targets, the computer program product comprising means, stored on a non-transitory computer readable medium, for:
   representing at least one target by a plurality of coordinate representations, sensor values and angle commands collectively;
   mapping between at least two coordinate representations;
   implementing at least one training scenario that implements a learning method for learning the mapping between at least two of the coordinate representations wherein the plurality of coordinate representations comprises;
   at least one eye centered coordinate representation of the at least one target; at least one head centered coordinate representation of the at least one target;
   and at least one body centered coordinate representation of the at least one target;
   a first current pan and a first current tilt angles of a first eye camera;
   a first current pan and a first current tilt angles of a second eye camera;
   first current pan and a first current tilt angles of a head.

* * * * *